(12) United States Patent
Panchamukhi et al.

(10) Patent No.: US 7,950,001 B2
(45) Date of Patent: May 24, 2011

(54) METHOD AND APPARATUS FOR INSTRUMENTATION IN A MULTIPROCESSING ENVIRONMENT

(75) Inventors: Prasanna S Panchamukhi, Bangalore (IN); Maneesh Soni, Karnataka (IN)

(73) Assignee: International Business Machines Corporation, Armonk, NY (US)

(*) Notice: Subject to any disclaimer, the term of this patent is extended or adjusted under 35 U.S.C. 154(b) by 1119 days.

(21) Appl. No.: 11/530,316

(22) Filed: Sep. 8, 2006

(65) Prior Publication Data

US 2008/0127117 A1    May 29, 2008

(51) Int. Cl.
*G06F 9/44* (2006.01)
*G06F 9/45* (2006.01)
*G06F 11/00* (2006.01)

(52) U.S. Cl. ........ 717/124; 717/127; 717/128; 717/129; 717/130; 717/131; 717/134; 714/35

(58) Field of Classification Search ................... 717/124, 717/128, 129, 133, 158, 127, 130, 131, 134; 714/35

See application file for complete search history.

(56) References Cited

U.S. PATENT DOCUMENTS

| | | | | |
|---|---|---|---|---|
| 5,590,335 A * | 12/1996 | Dubourreau et al. | ......... | 718/104 |
| 5,632,032 A * | 5/1997 | Ault et al. | ..................... | 718/100 |
| 6,006,033 A * | 12/1999 | Heisch | .......................... | 717/158 |
| 6,378,125 B1 * | 4/2002 | Bates et al. | ................... | 717/129 |
| 6,708,326 B1 * | 3/2004 | Bhattacarya | ................. | 717/124 |
| 6,898,785 B2 * | 5/2005 | Ramasamy et al. | ......... | 717/129 |
| 6,978,399 B2 * | 12/2005 | Bates et al. | .................... | 714/34 |
| 6,981,248 B2 * | 12/2005 | Bates et al. | ................... | 717/129 |
| 6,986,052 B1 * | 1/2006 | Mittal | .......................... | 713/190 |
| 6,990,657 B2 * | 1/2006 | Hunter et al. | ................. | 717/129 |
| 7,178,002 B2 * | 2/2007 | Boucher | ....................... | 711/170 |
| 7,305,661 B1 * | 12/2007 | Leventhal et al. | ........... | 717/128 |
| 7,350,196 B1 * | 3/2008 | Cantrill | ......................... | 717/128 |
| 2002/0073402 A1 * | 6/2002 | Sangavarapu et al. | ........ | 717/129 |
| 2003/0056199 A1 * | 3/2003 | Li et al. | .......................... | 717/127 |
| 2003/0056200 A1 * | 3/2003 | Li et al. | .......................... | 717/128 |
| 2003/0191929 A1 * | 10/2003 | Cornaby et al. | .............. | 712/245 |
| 2005/0034024 A1 * | 2/2005 | Alverson et al. | ................. | 714/38 |
| 2005/0165754 A1 | 7/2005 | Valliappan et al. | | |
| 2005/0210454 A1 * | 9/2005 | DeWitt et al. | ................. | 717/133 |
| 2005/0229163 A1 * | 10/2005 | Bates et al. | .................... | 717/129 |
| 2005/0246691 A1 * | 11/2005 | Hsieh et al. | .................... | 717/129 |
| 2006/0048098 A1 * | 3/2006 | Gatlin et al. | ................... | 717/124 |
| 2006/0130016 A1 * | 6/2006 | Wagner | .......................... | 717/136 |

(Continued)

OTHER PUBLICATIONS

Ramsey, N "Correctness of trap-based breakpoint implementations" Conference Record of POPL '94: 21st ACM SIGPLAN-SIGACT Symposium on Principles of Programming Languages, 1994, p. 15-24.

(Continued)

*Primary Examiner* — Emerson C Puente
*Assistant Examiner* — Charles Swift
(74) *Attorney, Agent, or Firm* — Yee & Associates, P.C.; David A. Mims, Jr.

(57) ABSTRACT

A method of instrumentation, preferably a computer implemented method for instrumentation, in a program which contains an original program. The original instruction is copied into a user address space which has an unused stack space. When a breakpoint is encountered the original instruction is executed out-of-line in the unused stack space by single stepping. Using this debugging in a multithreaded environment is advantageous as all threads will switch into the unused stack space and execute the breakpoint.

11 Claims, 9 Drawing Sheets

U.S. PATENT DOCUMENTS

| | | | |
|---|---|---|---|
| 2007/0011686 A1* | 1/2007 | Ben-Zvi | 719/310 |
| 2007/0150867 A1* | 6/2007 | Barsness et al. | 717/124 |
| 2007/0168968 A1* | 7/2007 | Bates et al. | 717/124 |
| 2007/0234294 A1* | 10/2007 | Gooding | 717/124 |

OTHER PUBLICATIONS

Kempf, J.; Kessler, P.B "Cross-address space dynamic linking" Proceedings of the Second International Workshop on Object Orientation in Operating systems (Cat. No. 92TH0477-0), 1992, p. 250-6.

Johnson, D "Trap architectures for Lisp systems" Proceedings of the 1990 ACM Conference on LISP and Functional Programming, 1990, p. 79-86.

Lewis, S.M. "Verify-a useful Forth programming tool" 1983 Rochester Forth Applications Conference, 1983, p. 239-49.

Moore, J Richard "A universal dynamic trace for Linux and other operating systems" USENIX Annual Technical Conference 2001, Boston, USA.

* cited by examiner

METHOD AND APPARATUS FOR INSTRUMENTATION IN A MULTIPROCESSING ENVIRONMENT

BACKGROUND OF THE INVENTION

1. Field of the Invention

This invention generally relates to method of debugging, and more particularly, to instrumentation (i.e. debugging) of software executable programs during runtime in a multiprocessing environment.

2. Description of the Related Art

Debugging is a methodical process of finding and reducing a number of bugs or defects a computer program, thus making it behave as expected. Debugging tends to be harder when various subsystems are tightly coupled, as changes in one may cause bugs to emerge in another.

Generally, debugging a program is a cumbersome and tiring task. The debugging skill of a programmer is probably the biggest factor in the ability to debug a problem, but the difficulty of software debugging varies greatly with the programming language used and the available tools, such as debuggers. Debuggers are software tools which enable programmer to monitor the execution of a program, stop it, re-start it, run it in slow motion, more importantly change values in memory and even, in some cases go back in time by reversing the execution order of program instructions, which is sometimes referred to as "rolling back".

To get debugging information during runtime, developers adopt to use a dynamic tracing mechanism, referred to as dynamic instrumentation, typically inserting breakpoints, also referred to as probes, during runtimes at various paths, collecting the relevant data from the breakpoints and continuing normal execution without disrupting the execution of the program. Inserting breakpoints is typically a method used by programmers wherein a breakpoint is placed at a point of interest in a program, replacing an original instruction(s) and trace data is collected in a breakpoint handle when program execution reaches the breakpoint. The breakpoint instruction is replaced by the original instruction(s), execution is single stepped, and after single stepping the original instructions is again replaced by the breakpoint instruction.

Typically in an uniprocess environment and all instances of breakpoints are traced successfully. In a multiprocessor environment, breakpoints are sometimes missed for example on threads running the same instructions on different processors, where one thread hits the breakpoint and single steps on the original instruction while another may execute the replaced original instruction. A disadvantage is that in a multiprocessor environment, such breakpoints seem to be missed on one processor while some other processors single steps on the original instructions, thereby missing some instances.

For example, consider a program to add two numbers, wherein a program is a sequence of instructions. Accordingly, the following four program to add two numbers:

| Get a first number | 1: get A |
|---|---|
| Get a second number | 2: get B |
| Add two numbers | 3: add A, B |
| Print result of addition | 4: print result |

This program might require debugging at step 3 to verify the inputs provided to the program by inserting a breakpoint instruction at step 3. The original instruction is copied into an allocated memory location and the original instruction is replaced with the breakpoint instruction. When the breakpoint is encountered, the program generates an exception. The debugger removes the breakpoint instruction, puts the original instruction back in the program and executes it there, and inserting the breakpoint instruction back for next execution cycle.

However, when multiple threads run the same program, a first thread "A" executed the addition program and the breakpoint is hit. When the breakpoint instruction is removed and original instruction is inserted back, the program appears as
1: get A
2: get B
3: break-here
4: print result
where the original instruction address was "add A,B". Therefore, before the breakpoint instruction is inserted back for the next execution cycle, there is a window where some other thread "B" executing the same program fails to notice or encounter the breakpoint instruction. Hence, when the same program is being executed by thread B, there will not be any exception generated and there will not be any opportunity to save the debugging information, thereby missing the information in thread B.

Therefore there is a need for improved instrumentation for multiprocessing environments, preferably dynamic instrumentation, and without a way to improve instrumentation, the promise of this technology may never be fully achieved.

SUMMARY OF THE INVENTION

The presently preferred embodiment is in a method for instrumentation, preferably a computer implemented method for instrumentation, in a program which contains an original program. The original instruction is copied into a user address space which has an unused stack space. When a breakpoint is encountered the original instruction is executed out-of-line in the unused stack space by single stepping. Using this debugging in a multithreaded environment is advantageous as all threads will switch into the unused stack space thereby executing all breakpoints without any breakpoints being missed. Additionally, the original instruction is executed out-of-line from the location of the breakpoint, which does not form part of the actual sequence of the programs instructions.

DETAILED DESCRIPTION

Figure 1:
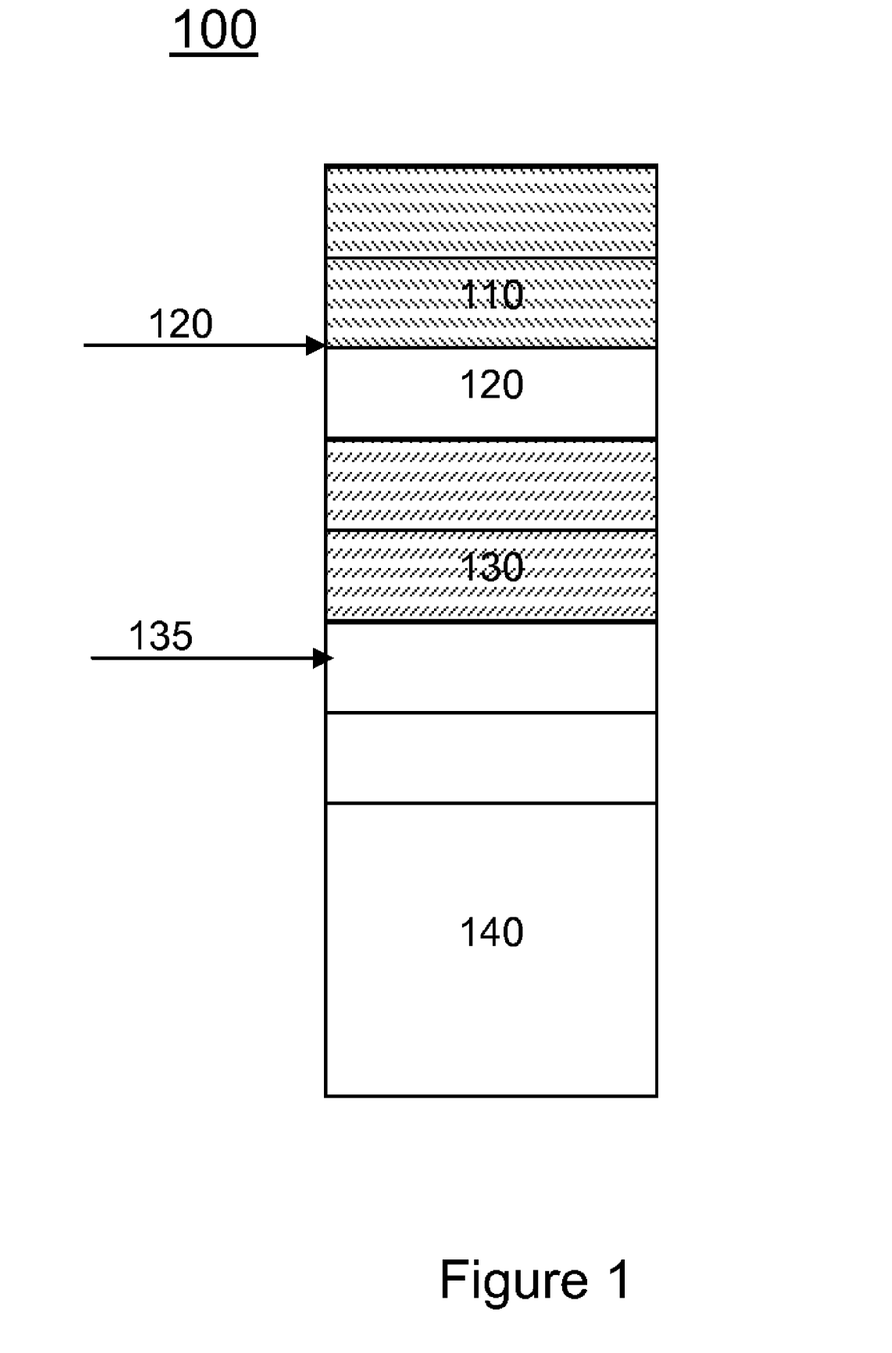
FIG. 1 depicts a schematic representation of a user process stack within a page.

FIG. 1 depicts a schematic representation of a user process stack within a page, for example a memory page. The user stack 100 contains argument space 110 to store arguments, a base pointer 120, local variables space 130 to store variables, a stack pointer 135 and an unused user stack space 140. The stack pointer "esp" 135 points to the end of the stack space used thereby indicates the amount of stack consumed by the user stack 100. The user stack below the stack pointer "esp" 135 is the unused user stack 140.

The size of the unused user stack 140 can be configured to grow or shrink. If the application stack grows, the unused user stack 140 below the stack pointer 135 can be used to store original instructions, amongst other information. When the original instructions are copied into the unused user stack 140, those original instructions can be executed out-of-line in the unused user stack 140 for example by single stepping.

Each user process, hereinafter also referred to as a function, uses the user stack 100 to store functional arguments 110, local variables 120, 130 etc. The stack pointer 135 points to end of stack space used in the user stack 100. This user stack 100 is configured to expand or grow when new local variables are allocated to the user stack 100, and configured to shrink when for example a function returns values. "ebp" 120 is a base pointer which contains a base address of the user stack 100. When each function is called, a user stack 100 is created and the base pointer 120 points to the beginning of the user stack 100 used for that function. In contrast the stack pointer 135 points to the end of the user stack 100 used for that function.

Figure 2A:
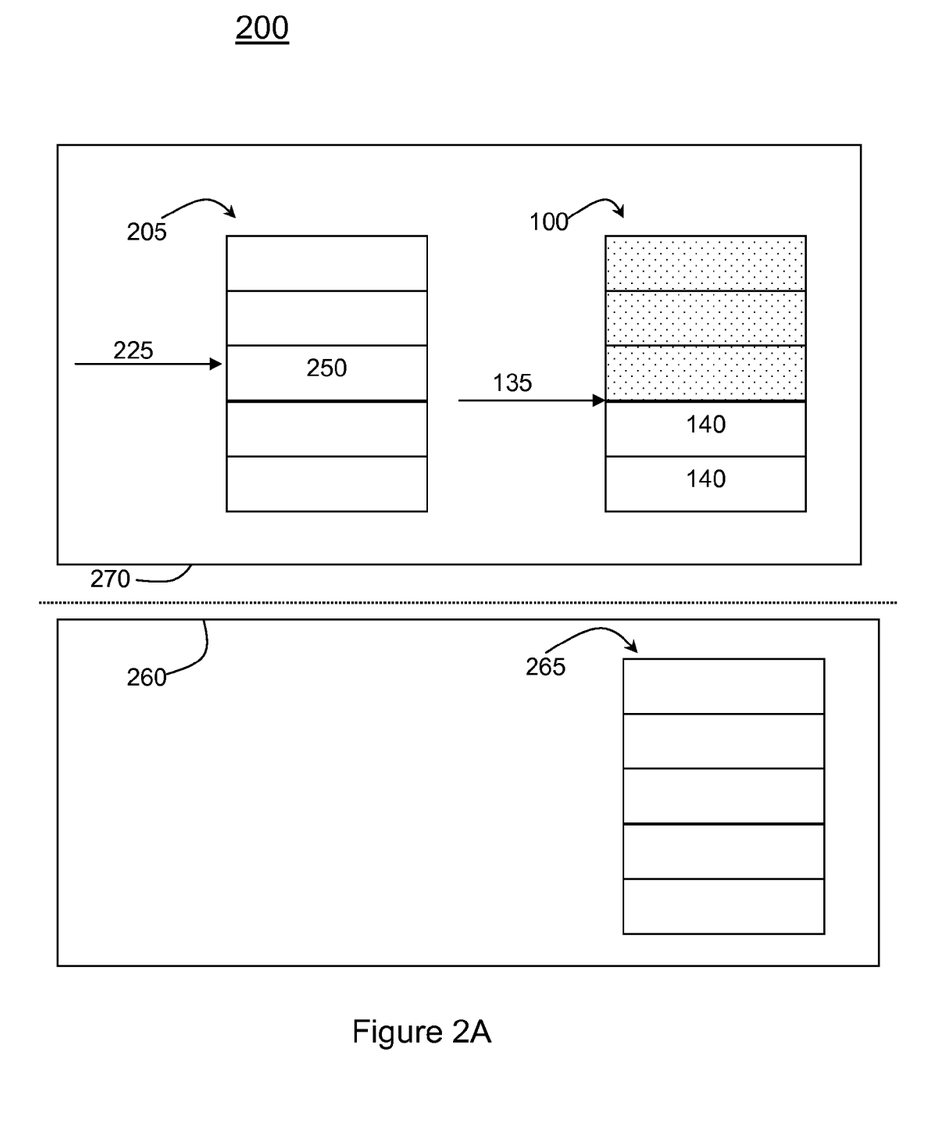
FIG. 2A illustrates an exemplary embodiment of a user space and a kernel space prior to inserting a breakpoint.

FIG. 2A illustrates an exemplary embodiment of a stack within a page 200, for example a memory page, consisting of a user space 270 and a kernel space 260 prior to inserting a breakpoint. The user space 270 consists of the user stack 100 and a user code 205 before insertion of a breakpoint. An original instruction 250 for example "move eax, ebx", is located at the probed address containing the instruction pointer "eip" 225. The used stack space in the user stack 100 is shown schematically before the stack pointer 135 (dotted blocks) and the unused stack space 140 is shown schematically to be below the stack pointer 135. The instruction pointer 225 is used by the processor to point to the next instruction which has to be executed. The kernel space 260 consisting of the kernel stack 265. The dotted line in FIG. 2 separates the user space 270 from the kernel space 260. It should however be apparent to a person skilled in the art that devices with a processor that are capable of performing debugging fall within the scope of this invention.

Figure 2B:
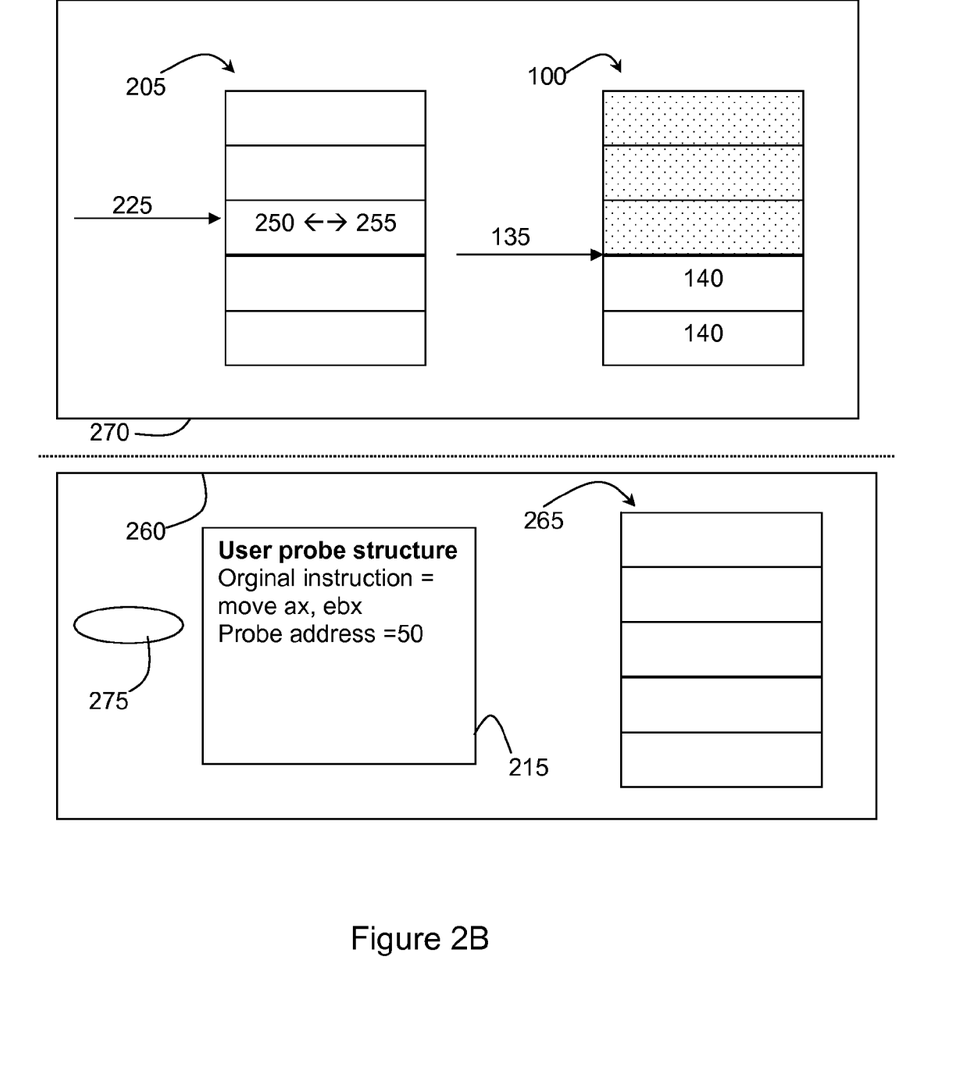
FIG. 2B illustrates an exemplary embodiment of a user space and kernel space after inserting a breakpoint.

FIG. 2B illustrates an exemplary embodiment of a user space and kernel space after inserting a breakpoint. A user probe mechanism, shown as user probe structure in FIG. 2B, defined within the kernel data mode 215 is configured to insert the breakpoint instruction 255 in the user text address space 205 at the location replacing the original instruction 250 at the probed address. The original instruction is moved to and saved in kernel data mode 215. A probe handler 275 is also defined in the kernel space 260 where the user space probes mechanism uses two exceptions per probe.

One exception is due to the execution of the breakpoint instruction 255, for example "int3" in the case of Intel's IA32 architecture, and the second exception is the debug exception due to single stepping of an instruction. Both exceptions are handled in the kernel space 260 in the kernel mode. The processor's exception handling mechanism is configured by default to save a few registers, for example in the case of the IA32 architecture, "esp", "eip", "eflags", "error code" etc., on the exception handler's stack or the kernel stack 265 if there is a stack switch from the user space 270 to the kernel space 260. Because breakpoint exceptions occur in the user space 270, the user stack 100 is switched from the user space 270 to the kernel space 260. The remaining registers are stored in the Kernel mode exception handles on the kernel stack 265.

Figure 2C:
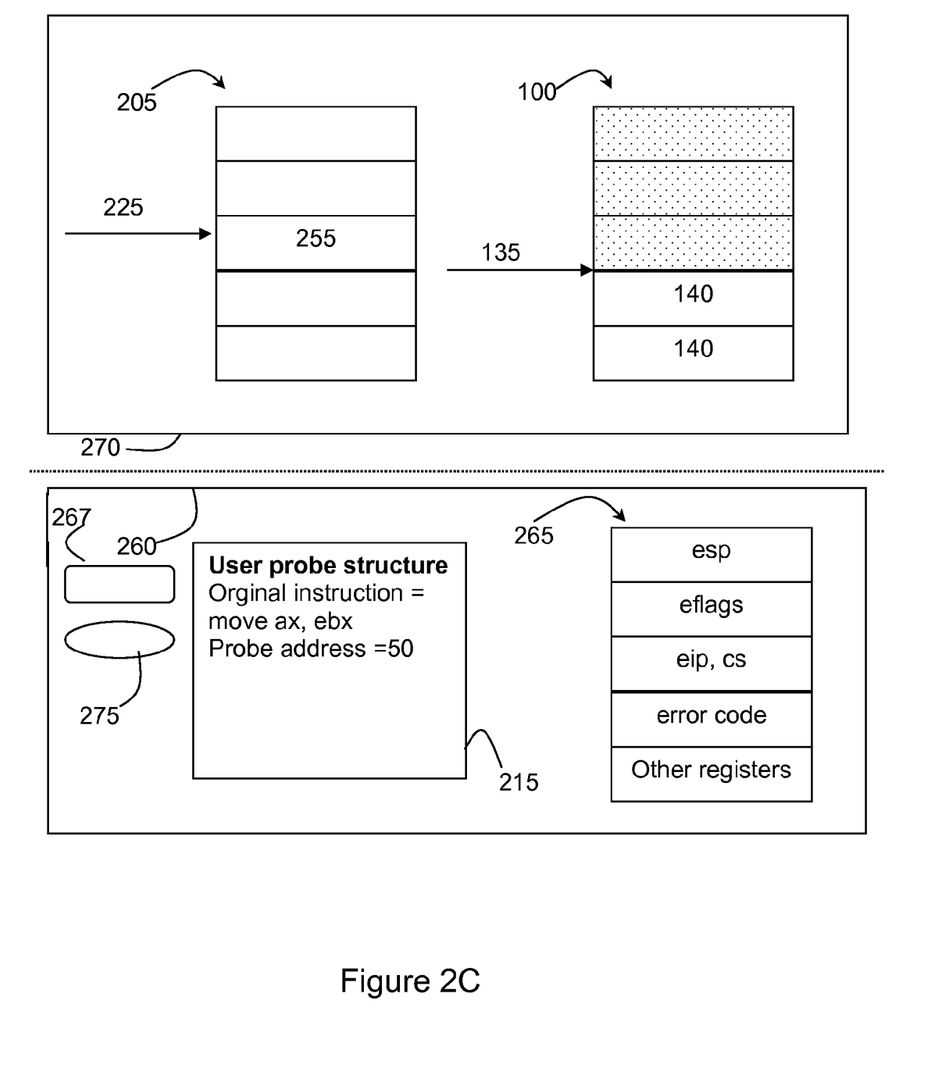
FIG. 2C illustrates an exemplary embodiment of a schematic representation of the kernel space and user space in when the breakpoint exception is executed.

FIG. 2C shows an exemplary embodiment of the kernel space 260 and user space 270 in when the breakpoint exception 255 is encountered and executed. Program execution is transferred to the exception handler 267 in the kernel space 260 when the breakpoint is encountered at the breakpoint address 255. The processors exception handling mechanism saves the user space registers on the kernel stack 265 for the exception handler 267 to use the user space registers.

Figure 2D:
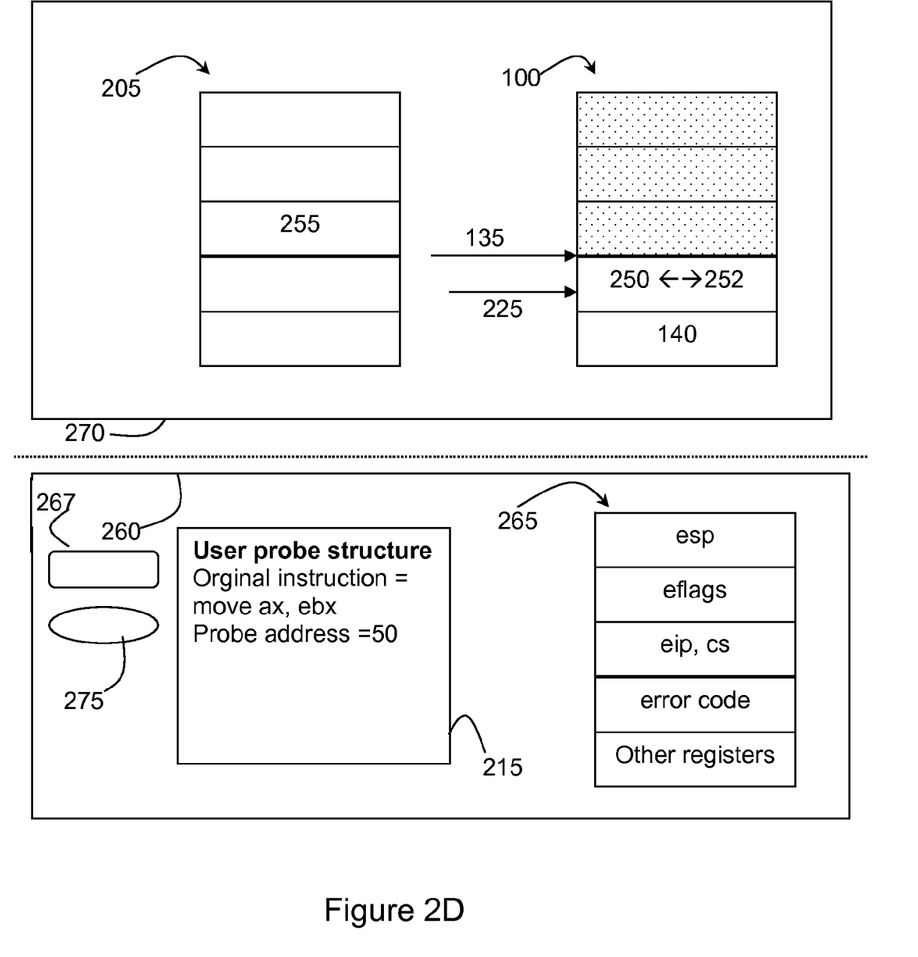
FIG. 2D illustrates an exemplary embodiment of a snapshot of the user space and the kernel space when execution returns from the exception handler.

FIG. 2D shows an exemplary embodiment of a snapshot of the user space 270 and the kernel space 260 when execution returns from the exception when the breakpoint exception executes, exception handler 267 and the probe handler 275 executes to collect instrumentation data. The original instruction 250 from the probed address is copied to the unused stack locations 252 in the user stack 100 if there is sufficient unused stack space 140 in the user stack 100. The instruction pointer 225 is changed to the stack location 252 where the original instruction 250 is copied. A "single stepping" flag is set to enable the single step handler after the original instruction 250 is executed. The registers are restored from the kernel stack 265 which completes the breakpoint exception 255 handling in the kernel space 260.

Figure 2E:
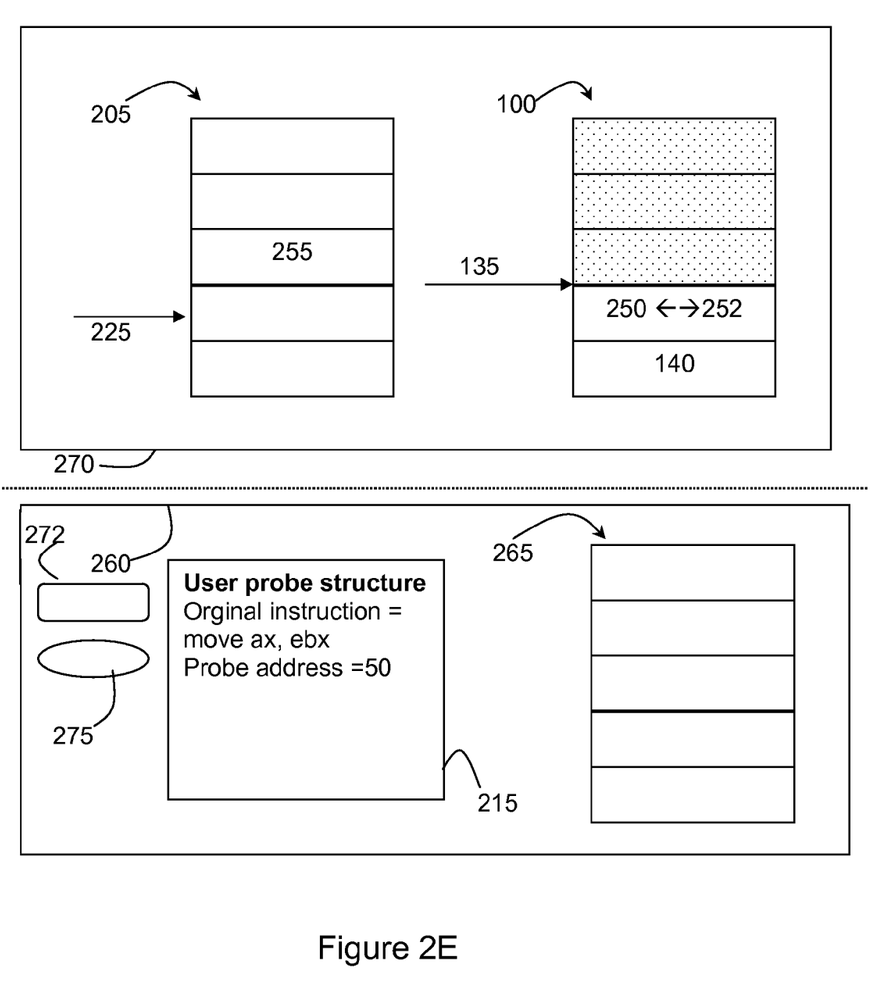
FIG. 2E illustrates an exemplary embodiment of a snapshot of the user space and the kernel space when control returns from a single step handler.

FIG. 2E shows an exemplary embodiment of a snapshot of the user space 270 and the kernel space 260 when control returns from a single step handler 272. Execution control is returned to the user space 270 when the original instruction 252 is executed and the instruction pointer 225 is incremented to execute the next instruction. However because the "single stepping" flag was set, the single step exception is generated and the control transfers to the single stepping exception handler 272 in the kernel space 260. As before, some registers are copied to the kernel stack 265 by the processor and other registers are copied to the kernel stack by the kernel space 260 exception handler 267. The user space probe structure defined in the kernel data mode 215 now points the instruction pointer 225 back to the next instruction after the probed address 252. The saved registers are restored and the control returned to the user space 270 to resume execution of the program. If there is insufficient unused user stack space 140 for a location 252 to store the original instruction 250, the user stack 100 is expanded to create unused user stack space 140.

Figure 2F:
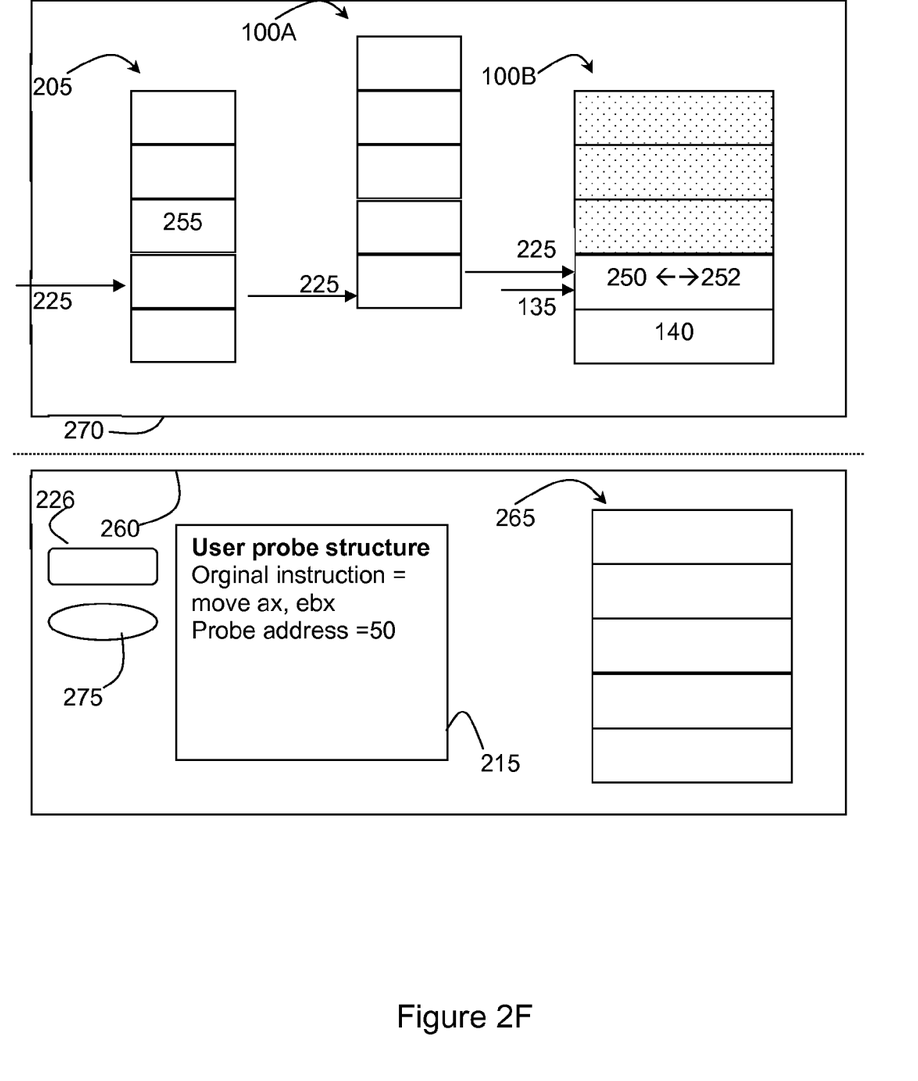
FIG. 2F shows a snapshot of the user space and the kernel space after a stack expansion.

FIG. 2F shows an exemplary embodiment of a snapshot of the user space 270 and the kernel space 260 after a stack expansion. The probe handler 275 in the kernel space 260 first attempts to use the existing unused address space 140 in the user stack 100. In this case the stack pointer 135 defines the page boundary for the user stack 100. If there is no unused free user stack address space 100 available the probe handler 275 expands the user stack address space below the stack pointer 135. This is typically achieved by the kernel allocating a new memory page and linking it to the existing set of pages. Further, the corresponding per process memory management data structures are updated to reflect the new stack space. The original instruction 250 at the probe address 252 is then copied to a location 252 to the expanded stack for out of line execution. 100A defines the stack before execution and 100B shows the stack after execution.

Figure 3:
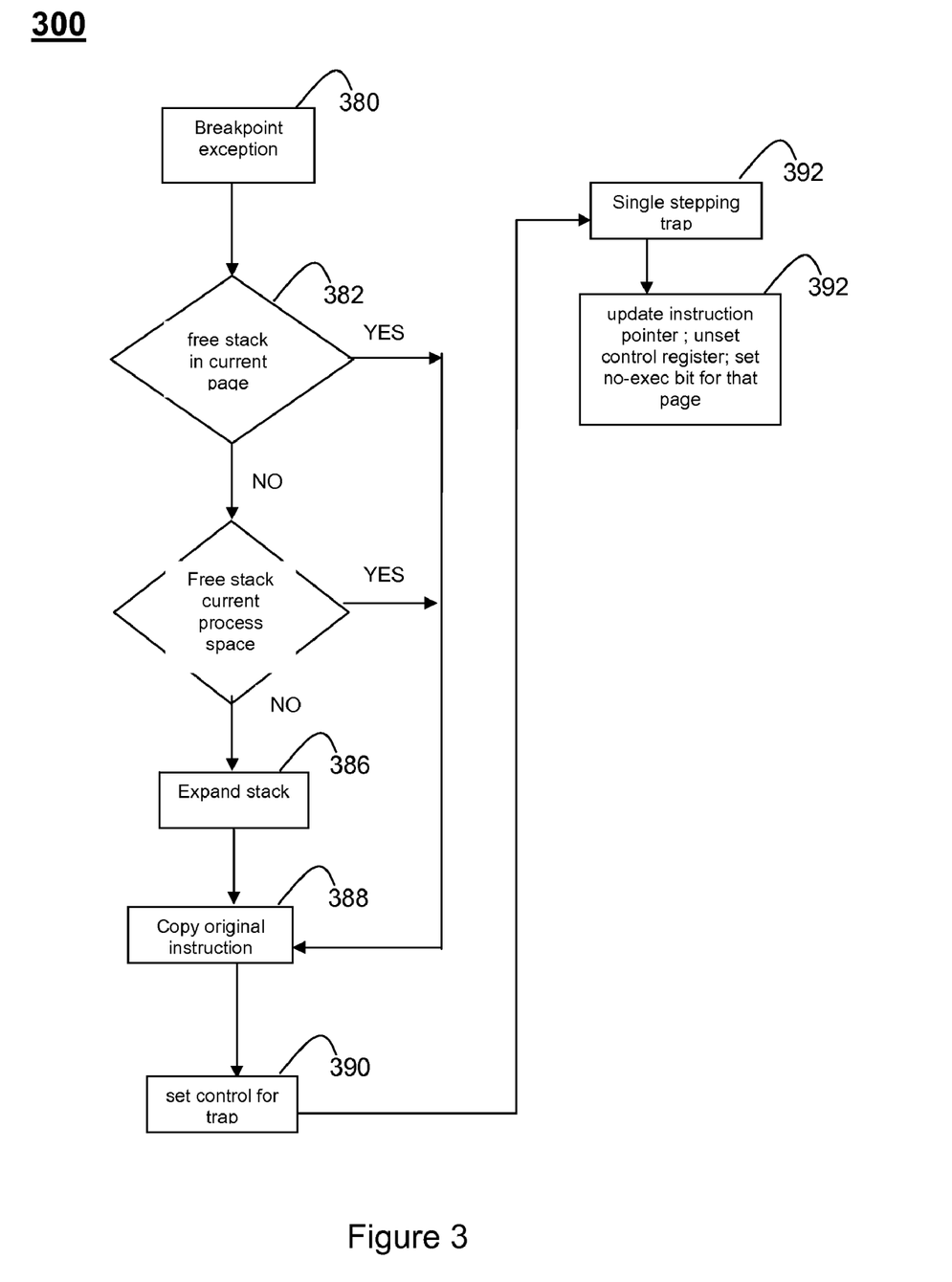
FIG. 3 shows a flow chart for a method of dynamic instrumentation of single stepping out-of-line.

FIG. 3 is an exemplary embodiment of a flowchart showing a method 300 of debugging by single stepping out-of-line. For user space probes, instruction copied into the kernel space cannot be single stepped, hence the instruction must be copied into the user space. The user function uses the user stack space to store local variables, arguments and return values. The user stack space below the stack pointer indicates the free stack space in the page. The solution is to find free stack space in the current process address in the user space and then copy the original instructions and single step that instruction.

When the breakpoint exception is encountered 380 free stack space is checked in 382. If there is insufficient stack space below the stack pointer in the current stack page, free stack space is checked for 384 in the subsequent stack pages after the current stack page in the current stack page in the current process address space. If insufficient stack space in the current process address space the stack segment for that process is expanded 386 beyond the current process stack address space and the original instruction (saved while inserting the probe) is copied 388 to a free location in the process user stack space. Then the instruction pointer is changed 390 to the point to location where the original instruction is copied. The original instruction is not replaced in this method. The processor control register is set so that the processor traps after it single steps the original instruction. Several processor architectures do not allow the original instruction to be executed from the user stack location, since the "no-exec" bit is set for the user stack pages. In those architectures, the page table entry corresponding to the stack page is identified and the "no-exec" bit is cleared, allowing instructions on the stack pages to be executed. After single stepping the original instruction the processor traps 392 and the instruction pointer is changed 394 to point to the next instruction after the instruction from the probed address. The offset to the next instruction is calculated by checking the original instruction opcode, operands, prefix etc. If the "no-exec" bit was cleared during single stepping, the "no-exec" bit is reset. After the instruction pointer points to the normal instruction, normal execution is continued. Subsequently, the breakpoint instruction is removed by overwriting the breakpoint instruction with the original instruction and the data structures allocated to store the original instructions are freed.

For example, in an exemplary embodiment wherein a program comprises a sequence of instructions to add two numbers, the method for debugging can be achieved as discussed below. Accordingly, the following instructions for the addition program are required for adding two numbers.

Get the first number

Get the second number

Add the two numbers

Print the result of addition

The following instructions of the program is translated into pseudo language as

1: get A

2: get B

3: add A, B

4: print result

Noticeably, the program comprises four instructions. The program needs to be debugged using the dynamic instrumentation method as discussed previously with regards to FIGS. 2A-2F. The values of two numbers need to be fetched from an input device or a storage device to the system prior to adding the two numbers such that the inputs provided to the program can be verified to be correct or incorrect.

To debug this adding program according to a preferred embodiment, the following steps are performed. First a location to insert a breakpoint is identified. In this example the breakpoint will be set at "location 3", i.e. "3:add A,B" so that during execution the program is probed at "location 3" in order to monitor the two values "A" and "B" input to the program. Next, copying the original instruction at the identified location into an allocated memory. This instruction should not over write the original instruction at "location 3" (i.e., 3: add A, B). Therefore, the original instruction needs to be stored in a safe location in the user space. The breakpoint instruction is inserted at "location 3".

Once the original instruction is copied into the safe location, next, the original instruction is replaced with a breakpoint instruction. After insertion of the breakpoint, the program would be 1: get A 2: get B 3: break-here (break point is inserted at this location)

4: print result

When program execution executes the breakpoint instruction at "location 3", an exception is generated and control is transferred to an exception handler of the kernel. At this stage a log can be created of the required debugging information, such as logging the values of A and B.

After generating the breakpoint exception, the original instruction is copied into an unused stack in the user space. Once logging of debugging information is completed, the breakpoint exception should be exited and normal execution of the program must continue to execute the original instruction "add A,B" that was present before the breakpoint instruction was inserted.

The breakpoint instruction is not removed. Instead, the original instruction is executed out-of-line. All threads continue to see the breakpoint instruction in the instruction sequence and the breakpoint is not missed even if multiple threads are executing the same program. The original instruction is executed out-of-line from its original location. Therefore a suitable location in the user space has to be located to which the original instruction can be copied and can executed out-of-line. The present invention utilizes the unused user stack space to achieve this. The original instruction, for example just the one instruction and not the entire user program, is copied to the unused user stack space. If there is no unused stack space available, there is a provision to expand the user stack address space and create unused stack address space. Preferably, the user stack address space bit is set to execute from being in the non-execute state, for example a "no-exec".

As discussed previously, an executable program can run in either in kernel space or in user space. When the program is executing in kernel mode, the original instruction is copied to a kernel space. But when the program is executing in user space, the user space instructions can not be executed in kernel space and from kernel space and the program needs a location in the user address space of the thread which got the breakpoint exception. In this invention the unused user stack is the location into which the original instruction can be copied and executed in the user space. The execution of the program is typically executed on a computer system comprising a processor and a memory.

Figure 4:
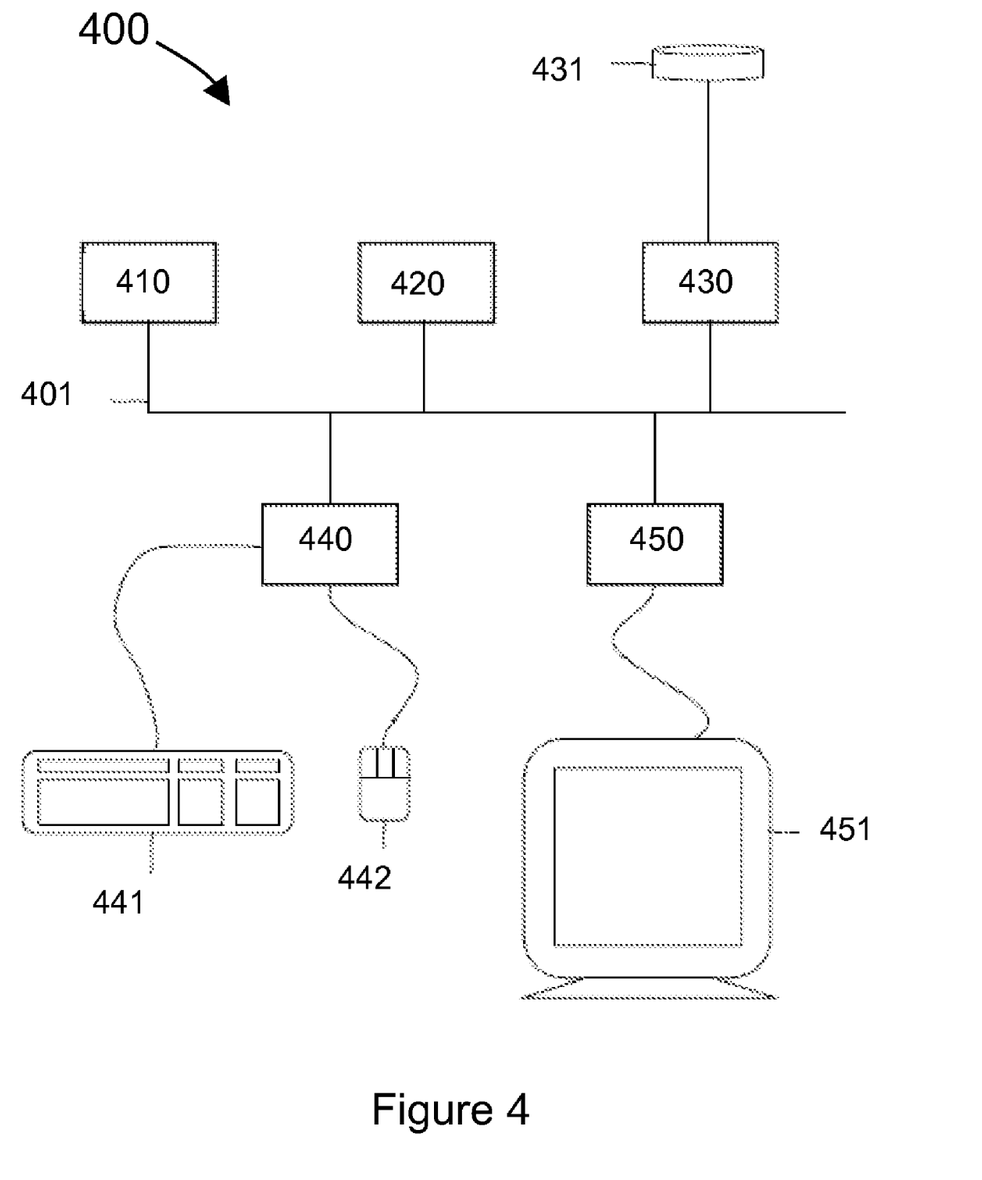
FIG. 4 illustrates a computing system suitable for use user space and kernel space of FIGS. 2A-2F and executing the method of FIG. 3.

FIG. 4 shows an exemplary embodiment of a computing system 400 comprising a system bus 401, a processor 410, a memory 420, a typical disk I/O adapter 430, a network interface (not shown in the Figure) and a user interface (UI) adapter 440. A disk storage device 431 is coupled to the disk I/O adapter 430. A keyboard 441, a mouse 442 and a display 443 are coupled to the UI adapter 440. A display device 451 is operatively coupled to the system bus 401 via a display adapter 450. The computing system 400 in accordance with the invention is capable of executing a computer program which is loaded from the disk storage device 431.

The computing system 400 stores the program and operating system. The computing system 400 loads the program into memory 420 and executes the program using the processor 410. The user inputs information to the system 400 using the keyboard 441 and/or the mouse 442. The system is configured to output information to the display device 451 coupled via the display adapter 450. The person skilled in the art will appreciate that there are numerous other embodiments of the workstation known in the art and that the present embodiment serves the purpose of illustrating the invention and must not be interpreted as limiting the invention to this particular embodiment.

The computing system 400 is a general-purpose computing device. Accordingly, the CPUs 410 may be any device capable of executing program instructions stored in the main memory 420 and may themselves be constructed from one or more microprocessors and/or integrated circuits. The main memory unit 420 in this embodiment also comprises an operating system, a plurality of application programs (such as the program installation manager), and some program data. The computing system 400 may contain multiple processors and/or processing cores, as is typical of larger, more capable computer systems where multiple threads are executing on multi processors, where all threads will switch into the unused space on the user stack and execute the original instruction without skipping a breakpoint. It should be apparent to a person skilled in the art that in other embodiments, the computing systems 400 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention. Therefore, should the embodiments described herein be considered in all respects as illustrative, not restrictive, and that reference be made only to the claims for determining the scope of the invention.

Although the invention has been described with reference to the embodiments described above, it will be evident that other embodiments may be alternatively used to achieve the same object. The scope of the invention is not limited to the embodiments described above, but can also be applied to debugging programs in general. It should be noted that the above-mentioned embodiments illustrate rather than limit the invention and that those skilled in the art will be able to design alternative embodiments without departing from the scope of the appended claims. In the claims, any reference signs should not limit the scope of the claim. The invention can be implemented by means of hardware and/or software comprising several distinct elements.

What is claimed is:

1. A method of instrumentation of a program, comprising:
   identifying a location of an original instruction in the program;
   copying the original instruction into an unused user stack space;
   replacing the original instruction in the program by storing a breakpoint instruction in the identified location of the original instruction to form a modified program, wherein an instruction sequence of the modified program includes the breakpoint instruction in the identified location instead of the original instruction;
   executing the breakpoint instruction and instructions in the modified program that are before the breakpoint instruction in the sequence, wherein a breakpoint exception is generated in response to executing the breakpoint instruction;
   executing the original instruction in the unused user stack space out-of-line after executing the breakpoint instruction, wherein execution of the original instruction is single stepped, and wherein a debug exception is generated in response to the single stepping;
   after executing the original instruction, executing instructions in the modified program that are after the breakpoint instruction in the sequence;
   prior to copying the original instruction into an unused user stack space, copying the original instruction at the identified location into a kernel data mode in a kernel space;
   wherein a user probe mechanism defined within the kernel data mode stores the breakpoint instruction in the identified location, and wherein an instruction pointer points to the breakpoint instruction after the breakpoint instruction is stored in the identified location;
   defining a probe handler in the kernel space when the user probe mechanism uses two exceptions per probe, wherein the two exceptions are the debug exception and the breakpoint exception, wherein the debug exception and the breakpoint exception are handled in the kernel space in the kernel mode;
   wherein the probe handler executes to collect instrumentation data after the breakpoint instruction has executed; and
   wherein the probe handler expanded a stack to create the unused user stack space.

2. A computer program stored in a data processing system comprising:
   computer executable instructions capable of:
   identifying a location of an original instruction in the program;
   copying the original instruction into an unused user stack space;
   replacing the original instruction in the program by storing a breakpoint instruction in the identified location of the original instruction to form a modified program, wherein an instruction sequence of the modified program includes the breakpoint instruction in the identified location instead of the original instruction;
   executing the breakpoint instruction and instructions in the modified program that are before the breakpoint instruction in the sequence, wherein a breakpoint exception is generated in response to executing the breakpoint instruction;
   executing the original instruction in the unused user stack space out-of-line after executing the breakpoint instruction, wherein execution of the original instruction is single stepped, and wherein a debug exception is generated in response to the single stepping;
   after executing the original instruction, executing instructions in the modified program that are after the breakpoint instruction in the sequence; and
   prior to copying the original instruction into an unused user stack space, copying the original instruction at the identified location into a kernel data mode in a kernel space;
   wherein a user probe mechanism defined within the kernel data mode stores the breakpoint instruction in the identified location, and wherein an instruction pointer points to the breakpoint instruction after the breakpoint instruction is stored in the identified location;
   defining a probe handler in the kernel space when the user probe mechanism uses two exceptions per probe, wherein the two exceptions are the debug exception and the breakpoint exception, wherein the debug exception and the breakpoint exception are handled in the kernel space in the kernel mode;

wherein the probe handler executes to collect instrumentation data after the breakpoint instruction has executed; and wherein the probe handler expanded a stack to create the unused user stack space.

3. The method of claim 1, further comprising:
including the program, modified program, and unused user stack space in a user space; and
executing the breakpoint instruction by: transferring program execution to an exception handler that is included in the kernel space; and saving user space registers on a kernel stack that is included in the kernel space for use by the exception handler.

4. The method of claim 3, wherein the user probe mechanism stores the breakpoint instruction in the identified location, and wherein an instruction pointer points to the breakpoint instruction after the breakpoint instruction is stored in the identified location, and further wherein the instruction pointer points to the original instruction after the breakpoint instruction has been executed.

5. The method according to claim 3, further comprising:
restoring the user space registers to the user space; and
after the original instruction has been executed: changing the instruction pointer to point to the instruction in the modified program that is next after the breakpoint instruction in the sequence.

6. The method of claim 1, further comprising:
setting an instruction pointer to point to the breakpoint instruction after the breakpoint instruction is stored in the identified location; and
after the breakpoint instruction has been executed: copying the original instruction from the kernel data mode in the kernel space into the unused user stack space in the user space; and
changing the instruction pointer to point to the original instruction in the unused user stack space.

7. The computer program product of claim 2, further comprising:
computer executable instructions capable of:
including the program, modified program, and unused user stack space in a user space; and
executing the breakpoint instruction by: transferring program execution to an exception handler that is included in the kernel space; and saving user space registers on a kernel stack that is included in the kernel space for use by the exception handler.

8. The computer program product of claim 7, wherein the user probe mechanism stores the breakpoint instruction in the identified location, and wherein an instruction pointer points to the breakpoint instruction after the breakpoint instruction is stored in the identified location, and further wherein the instruction pointer points to the original instruction after the breakpoint instruction has been executed.

9. The computer program product according to claim 7, further comprising:
computer executable instructions capable of:
restoring the user space registers to the user space; and
after the original instruction has been executed: changing the instruction pointer to point to the instruction in the modified program that is next after the breakpoint instruction in the sequence.

10. The computer program product of claim 2, further comprising:
computer executable instructions capable of:
setting an instruction pointer to point to the breakpoint instruction after the breakpoint instruction is stored in the identified location; and
after the breakpoint instruction has been executed: copying the original instruction from the kernel data mode in the kernel space into the unused user stack space in the user space; and changing the instruction pointer to point to the original instruction in the unused user stack space.

11. A method of instrumentation of a program, comprising:
identifying a location of an original instruction in the program;
copying the original instruction into an unused user stack space;
replacing the original instruction in the program by storing a breakpoint instruction in the identified location of the original instruction to form a modified program, wherein an instruction sequence of the modified program includes the breakpoint instruction in the identified location instead of the original instruction;
executing the breakpoint instruction and instructions in the modified program that are before the breakpoint instruction in the sequence, wherein a breakpoint exception is generated in response to executing the breakpoint instruction;
executing the original instruction in the unused user stack space out-of-line after executing the breakpoint instruction, wherein execution of the original instruction is single stepped, and wherein a debug exception is generated in response to the single stepping;
after executing the original instruction, executing instructions in the modified program that are after the breakpoint instruction in the sequence;
prior to copying the original instruction into an unused user stack space, copying the original instruction at the identified location into a kernel data mode in a kernel space;
wherein a user probe mechanism defined within the kernel data mode in the kernel space stores the breakpoint instruction in the identified location, and wherein an instruction pointer points to the breakpoint instruction after the breakpoint instruction is stored in the identified location;
defining a probe handler in the kernel space when the user probe mechanism uses two exceptions per probe, wherein the two exceptions are the debug exception and the breakpoint exception, wherein the debug exception and the breakpoint exception are handled in the kernel space in the kernel mode;
wherein the probe handler executes to collect instrumentation data after the breakpoint instruction has executed;
wherein the probe handler expanded a stack to create the unused user stack space;
setting a flag after the original instruction is executed;
generating a single step exception when the flag is set; and
transferring control to a single step handler in the kernel space.

* * * * *